(12) United States Patent
Pardington et al.

(10) Patent No.: US 9,021,812 B2
(45) Date of Patent: May 5, 2015

(54) COMBUSTOR DOME AND HEAT-SHIELD ASSEMBLY

(75) Inventors: Ronald B. Pardington, Gilbert, AZ (US); Paul Yankowich, Phoenix, AZ (US); Nagaraja S. Rudrapatna, Chandler, AZ (US); Thomas Frank Johnson, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 101 days.

(21) Appl. No.: 13/560,876

(22) Filed: Jul. 27, 2012

(65) Prior Publication Data

US 2014/0026580 A1 Jan. 30, 2014

(51) Int. Cl.
F02C 1/00 (2006.01)
F02G 3/00 (2006.01)
F02C 7/20 (2006.01)
F23R 3/14 (2006.01)
F23R 3/60 (2006.01)

(52) U.S. Cl.
CPC ...... F23R 3/14 (2013.01); F23R 3/60 (2013.01); Y02T 50/675 (2013.01); Y10T 29/49323 (2015.01)

(58) Field of Classification Search
CPC ..... F23R 3/14; F23R 3/60; F23R 2900/03041
USPC .......... 60/752–760, 737, 740, 746, 747, 748, 60/796, 799, 800
See application file for complete search history.

(56) References Cited

U.S. PATENT DOCUMENTS

| 4,525,996 | A | * | 7/1985 | Wright et al. ............... 60/796 |
|---|---|---|---|---|
| 5,490,378 | A | | 2/1996 | Berger et al. |
| 6,279,323 | B1 | | 8/2001 | Monty et al. |
| 6,530,227 | B1 | | 3/2003 | Young et al. |
| 6,546,733 | B2 | | 4/2003 | North et al. |
| 6,581,386 | B2 | | 6/2003 | Young et al. |
| 6,679,063 | B2 | | 1/2004 | Ebel |
| 6,983,599 | B2 | | 1/2006 | Young et al. |
| 7,080,515 | B2 | | 7/2006 | Wasif et al. |
| 7,246,494 | B2 | | 7/2007 | Currin et al. |
| 7,631,497 | B2 | * | 12/2009 | Panek ..................... 60/605.1 |
| 7,654,091 | B2 | | 2/2010 | Al-Roub et al. |
| 7,788,929 | B2 | | 9/2010 | Biebel et al. |
| 8,006,498 | B2 | | 8/2011 | Tschirren et al. |
| 8,096,134 | B2 | | 1/2012 | Hernandez et al. |
| 8,168,261 | B2 | * | 5/2012 | Loch et al. ................ 427/454 |
| 2007/0084215 | A1 | * | 4/2007 | Hernandez et al. ............ 60/796 |
| 2007/0180828 | A1 | * | 8/2007 | Webb ........................... 60/752 |
| 2008/0202122 | A1 | * | 8/2008 | Guezengar et al. ........... 60/722 |
| 2010/0326078 | A1 | * | 12/2010 | Pieussergues et al. ......... 60/740 |
| 2011/0000216 | A1 | | 1/2011 | Imamura et al. |

* cited by examiner

*Primary Examiner* — William H Rodriguez
*Assistant Examiner* — William Breazeal
(74) *Attorney, Agent, or Firm* — Ingrassia Fisher & Lorenz, P.C.

(57) ABSTRACT

A combustor dome and heat-shield assembly comprises a heat-shield having a first opening therethrough. A swirler extends through the first opening and captures the heat-shield. A dome having a second opening therethrough and has an upstream side and a downstream side. The swirler extends through the second opening from the downstream side to the upstream side to capture the heat-shield on the downstream side, and a retaining clip engages the swirler to secure the swirler and the heat-shield on the dome.

16 Claims, 8 Drawing Sheets

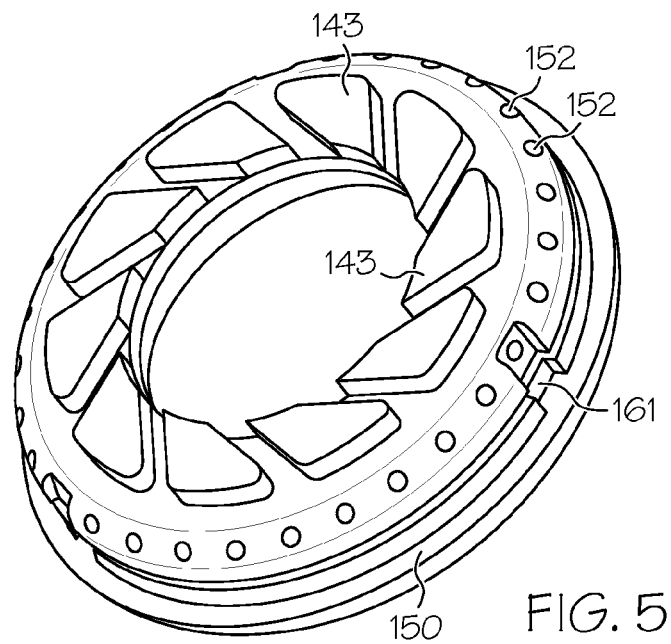
FIG. 5
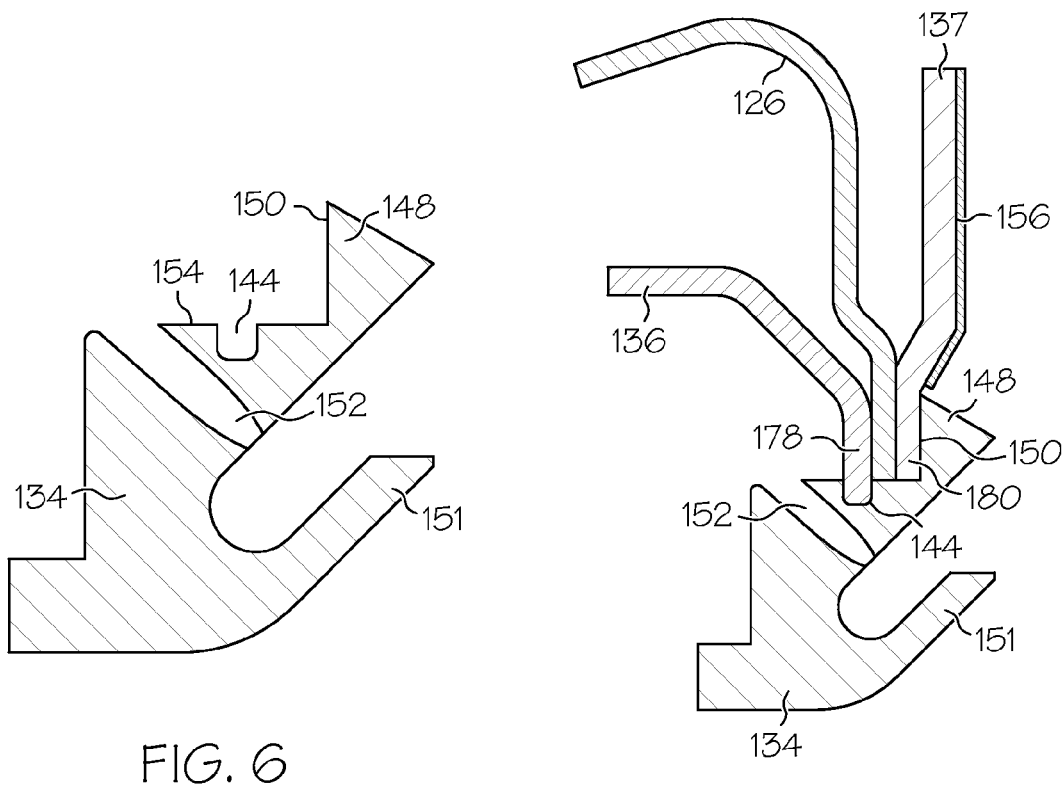
FIG. 6
FIG. 7

COMBUSTOR DOME AND HEAT-SHIELD ASSEMBLY

TECHNICAL FIELD

Embodiments of the subject matter described herein relate generally to gas turbine (GT) engines and, more particularly, to a combustor dome assembly that includes a swirler assembly that retains a heat-shield in its operative position.

BACKGROUND

Gas turbine (GT) engines, which are commonly deployed on aircraft, derive energy by igniting a mixture of fuel and air within a combustion chamber to drive turbines that power the engine's compressor. The combustor system of one known GT engine includes a combustion chamber having a combustor dome assembly that comprises a heat-shield and an annular housing section having multiple apertures therethrough. A carburetor assembly is disposed through each of the apertures and supplies a mixture of fuel and air to the interior of the combustion chamber for combustion therein. Each of the carburetor assemblies comprises a fuel-injector receiving portion and an air flow modulator, which may be formed as an integral part of the combustor's heat-shield. The fuel-injector receiving portion may take the form of, for example, a bellmouth that receives a hook-shaped fuel injector within its mouth portion. The air flow modulator includes a plurality of circumferential veins that extends from an outer annular surface to an inner annular surface. These veins receive air from one or more compressors and direct it into the interior of the air flow modulator where the air is mixed with injected fuel. The combustible fuel-air mixture is then delivered into the combustion chamber and ignited. Ideally, the air flow modulator receives the compressed air at a uniform pressure along its outer surface to minimize cross-flow and turbulence, though this is not often the case in actual practice.

In the past, the injector bellmouth, the swirler/heat-shield assembly, and the combustor dome were rigidly coupled together using, for example, a welding or brazing process. This rigid type of coupling, however, is not designed to accommodate the spatial displacement that may occur between various parts of the combustion system due to thermal expansion. For example, the combustor dome and the swirler/heat-shield assembly are heated by the combustive gases and may move relative to the fuel injector and fuel injector bellmouth, which remain relatively cool during combustion. To better accommodate the differences in thermal expansion, alternative coupling means have been developed that employ various components (e.g., retaining rings, clips, etc.) to secure and align the swirler/heat-shield assembly with the combustor dome and the bellmouth, while simultaneously permitting limited movement between the bellmouth and the combustor dome and swirler/heat-shield assembly. Though overcoming some of the disadvantages associated with welding and brazing, such "flexible" coupling means employ multiple components and, consequently, are relatively complex and expensive to manufacture and install.

In addition to the above, in one known arrangement, the combustor-dome/heat-shield assembly accounts for a significant percentage of the total combustor weight and manufacturing cost. That is, each combustor dome assembly comprises eight unique parts and three retaining features (i.e. one each for the dome heat-shield, the dome swirler, and the bellmouth that contribute weight and cost to the combustor).

Considering the forgoing, it should be appreciated that it would be desirable to provide a simplified retaining means for use in conjunction with a combustor dome assembly that employs fewer components resulting in a lighter, less expensive combustor dome assembly.

BRIEF DESCRIPTION OF THE DRAWINGS

The preferred exemplary embodiments will hereinafter be described in conjunction with the appended drawings, where like designations denote like elements, and:

FIGS. 5 and 6 are isometric and cross-sectional views of a swirler for use in the combustor dome shown in FIGS. 3 and 4 in accordance with an embodiment;

FIG. 7 is a cross-sectional view of the swirler shown in FIG. 6 capturing the retaining clip, dome, and heat-shield of the combustor dome assembly shown in FIG. 4;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
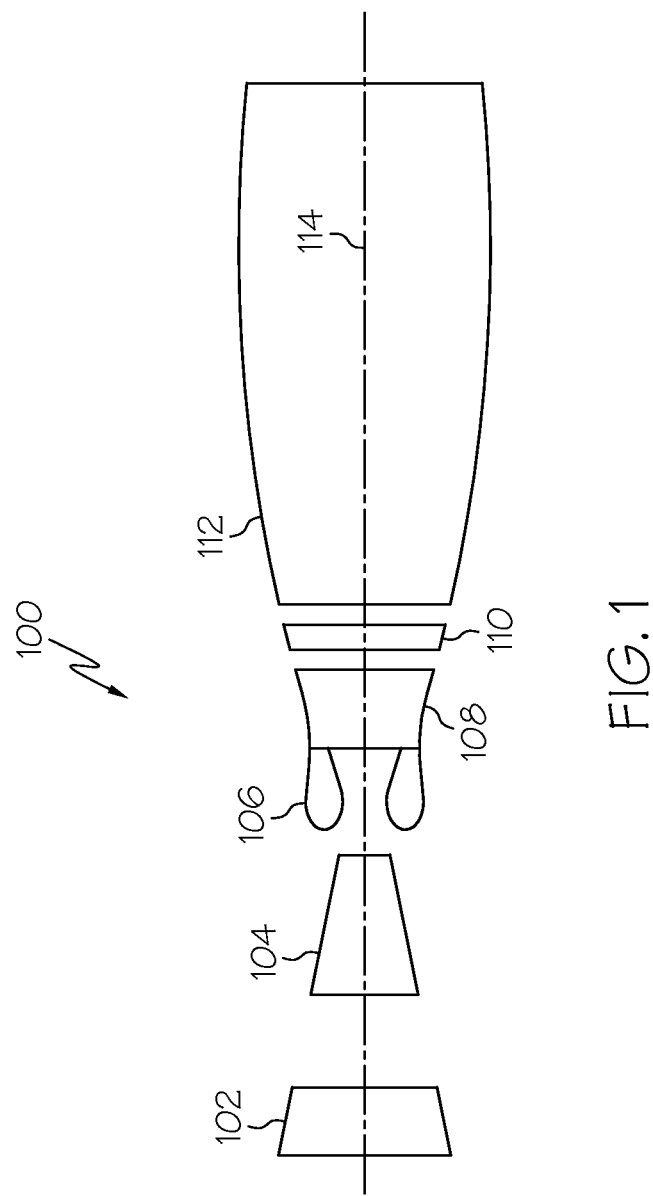
FIG. 1 is a simplified cross-sectional view of a gas turbine engine.

FIG. 1 is a simplified cross-sectional illustration of a gas turbine engine 100 comprising a low pressure compressor 102, a high pressure compressor 104, a combustor 106, a high pressure turbine 108, a low pressure turbine 110, and a nozzle 112, which are fixedly coupled together along a longitudinal axis 114. During operation of engine 100, air is supplied by compressors 102 and 104 to an upstream portion of combustor 106 wherein the air is mixed with fuel supplied by a plurality of fuel injectors (not shown). The fuel-air mixture is ignited within a combustion chamber of combustor 106 to produce a rapid increase in the temperature, velocity, and volume of the surrounding gas, which then drives turbines 108 and 110 before exiting engine 100 through nozzle 112.

Figure 2:
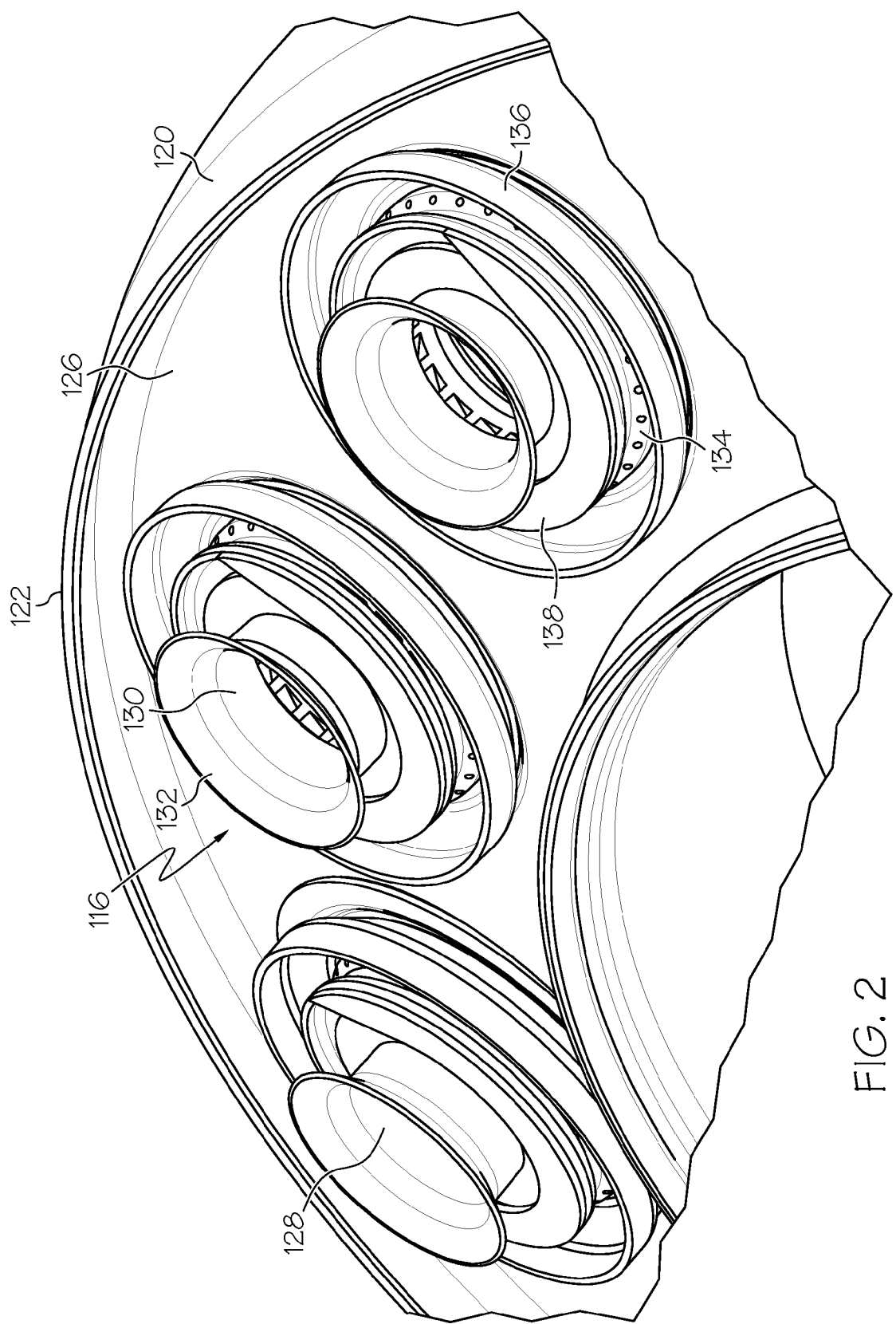
FIG. 2 is an isometric view of a portion of a combustor dome assembly including a swirler in accordance with a first embodiment of the present invention.
Figure 3:
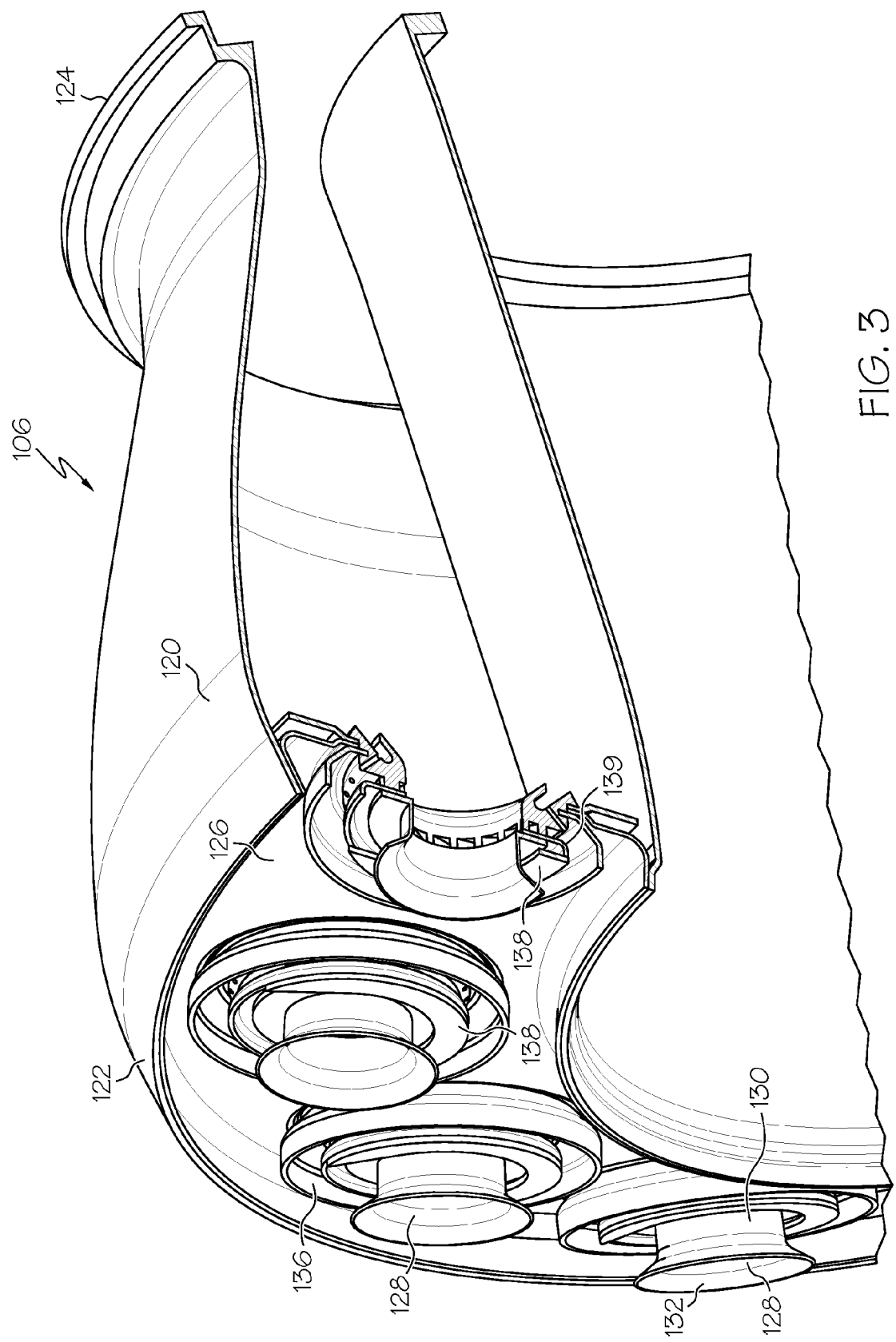
FIGS. 3 and 4 are cross-sectional views of the combustor dome assembly shown in FIG. 2.

FIGS. 2 and 3 are isometric and cross-sectional views of a portion of combustor 106. Combustor 106 comprises a combustion chamber housing 120 having an upstream end 122 and a downstream end 124 (shown in FIG. 3). A combustor dome assembly 116 is disposed proximate upstream end 122 and comprises an annular dome assembly 126 through which a plurality of orifices 128 is provided. Orifices 128 are angularly dispersed around longitudinal axis 114 of combustor 106 (FIG. 1). A carburetor assembly 130 is disposed through each of orifices 128 comprising a fuel-injector receiving element or bellmouth 132, an air flow modifier 134 commonly referred to as a swirler, a bellmouth retainer 138, a vane cover 139, and a swirler retaining ring 136, each of which is described in detail below. Carburetor assembly 130 is configured to facilitate mixing of the air passing through air swirler 134 with the fuel injected into bellmouth 132, and includes a flow passage therethrough for conducting the fuel-air mixture into combustion chamber housing 120.

Figure 4:
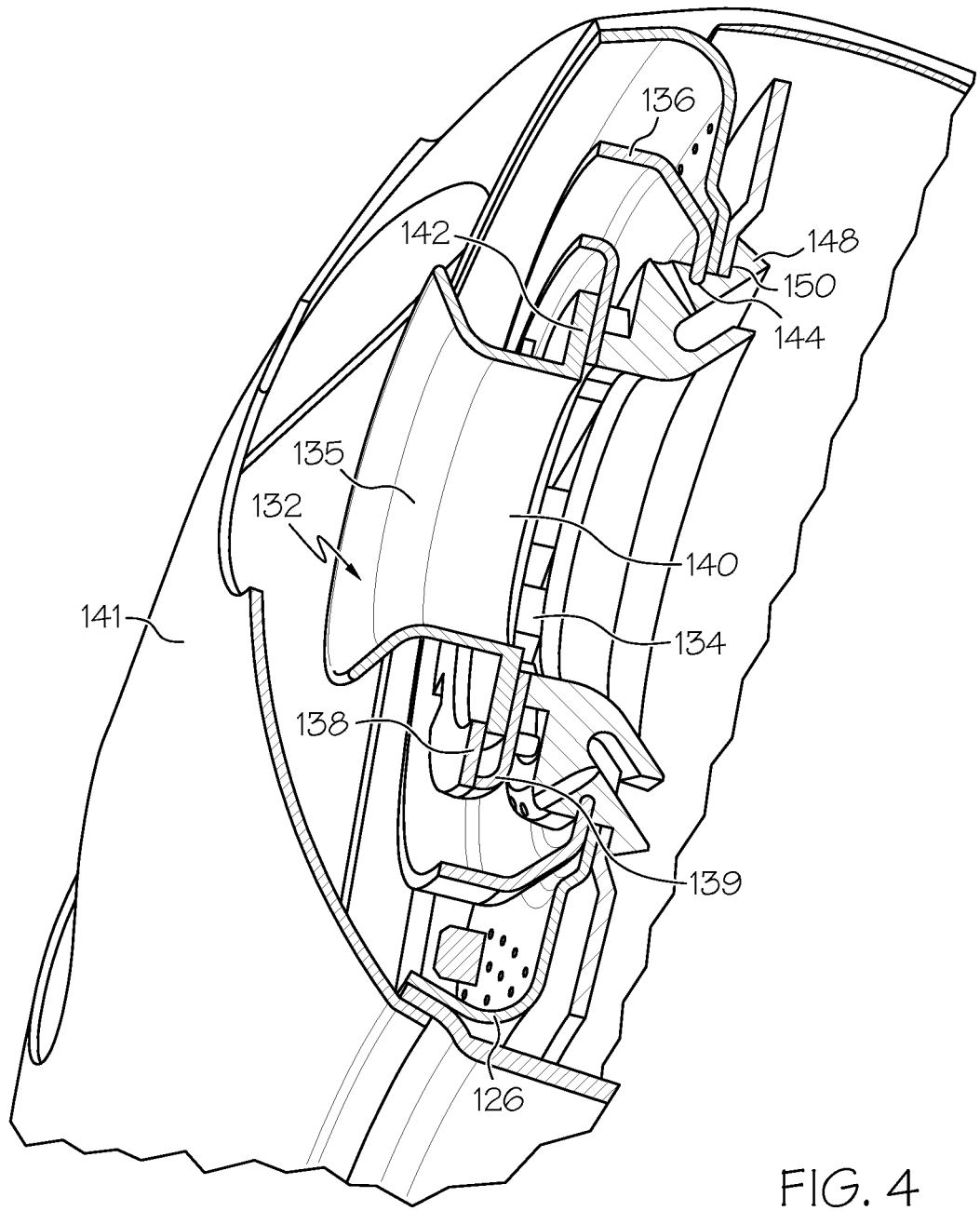

FIG. 4 illustrates each of the swirler assembly components in greater detail and positioned within shroud 141. Bellmouth 132 comprises a mouth portion 135, a generally tubular throat portion 140, and a flange portion 142 that extends radially outward from a downstream end of throat portion 140 and has an upstream surface and a downstream surface. A swirler vane cover 139 has a radial section coupled to an upstream portion of swirler 134 (e.g., by brazing), and an outboard axial section extending upstream. A radially extending bellmouth retainer 138 has an outboard end coupled to the outboard axial section of vane cover 139 (e.g., by welding) forming a radially extending slot therebetween for slidingly positioning flange 142, and therefore bellmouth 132. A fuel injector (not shown) is matingly received within bellmouth 132 and introduces fuel into throat 140. The injected fuel travels and subsequently mixes with air provided through swirler 134.

FIG. 5 is an isometric view of swirler 134 in accordance with an embodiment. As can be seen swirler 134 is a toroid in shape and includes a plurality of circumferential vanes 143 that receive compressed air from compressors 102 and 104 along an outer radial surface of swirler 134. Swirler 134 also includes a plurality of cooling channels 152 for cooling heat-shield 137 and lip 151. Vanes 143 alter the flow characteristics of the compressed air in the well-known manner and direct the air into orifice 128 (FIG. 3) just downstream of the bellmouth 132. Fuel injected into bellmouth 132 is thus mixed with the air supplied by air flow swirler 134 proximate orifice 128 and is subsequently ignited within the housing 120.

Figure 8:
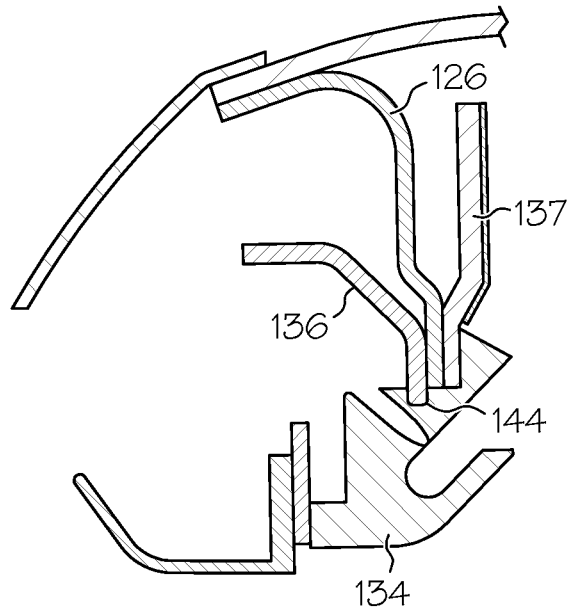
FIG. 8 is a cross-sectional view of a combustor dome assembly utilizing the swirler assembly of FIGS. 5, 6, and 7 in accordance with an embodiment.
Figure 8:
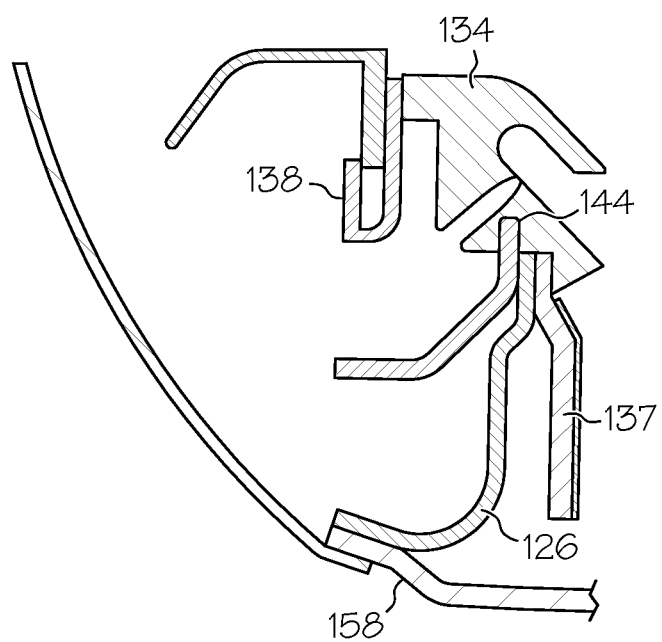

Referring to FIGS. 6, 7 and 8, swirler 134 is provided with a depression that may take the form of a circumferential groove 144. As will be seen, groove 144 is configured to receive a portion of retaining ring 136 (e. g. a split ring), which will capture and secure heat-shield 137 and annular dome assembly 126 between retaining clip 136 (which is secured within groove 144) and an annular, radially extending abutment 148 having flat surface 150.

Figure 11:
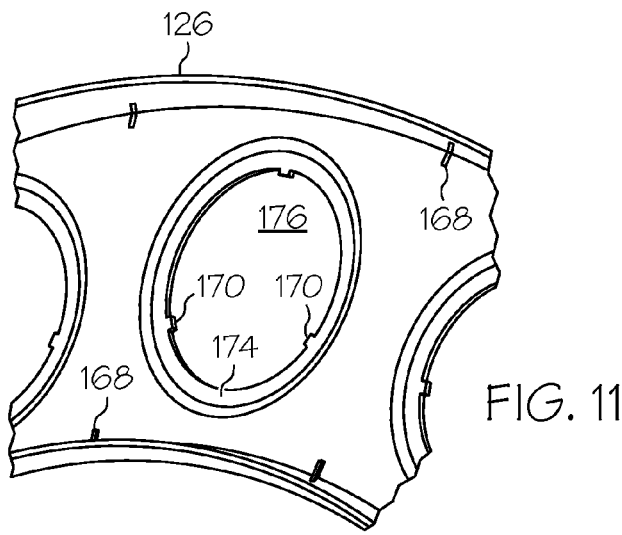
FIG. 11 is an isometric view of the upstream side of a dome for use in the combustor dome assembly shown in FIG. 8.

Swirler 134 is disposed proximate orifice 128 provided through annular dome assembly 126. If desired, swirler 134 may be coupled to a heat-shield 137 (as described below) that protects combustor dome assembly 116 from extreme temperatures during combustion. Heat-shield 137 may be stamped from, for example, a high-temperature nickel alloy. Swirler 134 and heat-shield assembly may then be secured in relation to annular dome assembly 126 and, therefore, combustion chamber housing 120, via retaining clip 136 as described in detail hereinbelow. Furthermore, slots 161 are provided at the periphery of swirler 134 that are configured to receive projections 170 (FIG. 11) on annular dome assembly 126 to prevent swirler 134 from rotating as will be described below.

FIGS. 6 and 7 are cross-sectional views of a section of swirler 134 in accordance with an embodiment. Referring to FIG. 6, swirler 134 is provided with annular groove 144 in an outer circumferential surface 154 thereof. In addition, swirler 134 comprises an outer circumferential abutment 148 having a radial surface 150. FIG. 7 illustrates how this configuration is capable of capturing dome assembly 126 and heat-shield 137. That is, an edge 174 of an opening 176 through dome assembly 126 (FIG. 11) is sandwiched between an inner annular region 178 of retaining clip 136 and an inner annular edge 180 of an opening 182 through heat-shield 137. In turn, the inner annular portion 178 of retaining clip 136 is constrained within swirler groove 144. The inner annular edge 180 of the opening 182 through heat-shield 137 abuttingly engages surface 150 of radial swirler 134. Thus, retaining clip 136, dome assembly 126, and heat-shield 137 are sandwiched between groove 144 and surface 150 and are captured therebetween. Finally, FIG. 8 is a cross-sectional view illustrating the upstream end of the combustor dome assembly configured to secure heat-shield 137, dome assembly 126, and retaining clip 136 between groove 144 and surface 150.

Figure 9:
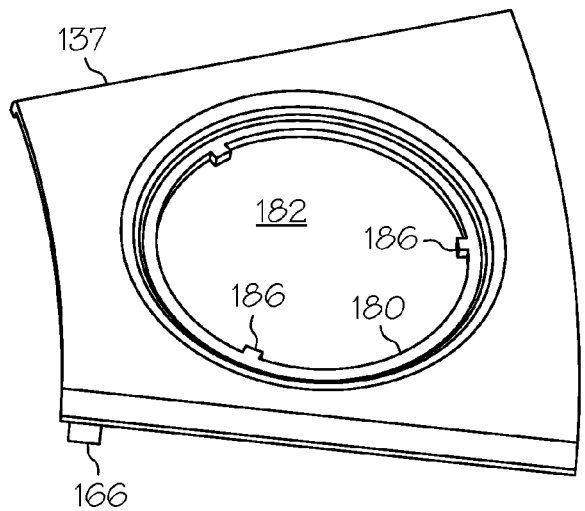
FIGS. 9 and 10 are isometric views of the downstream or heat side and upstream or cool sides of a heat-shield for use in the combustor dome assembly shown in FIG. 8.
Figure 10:
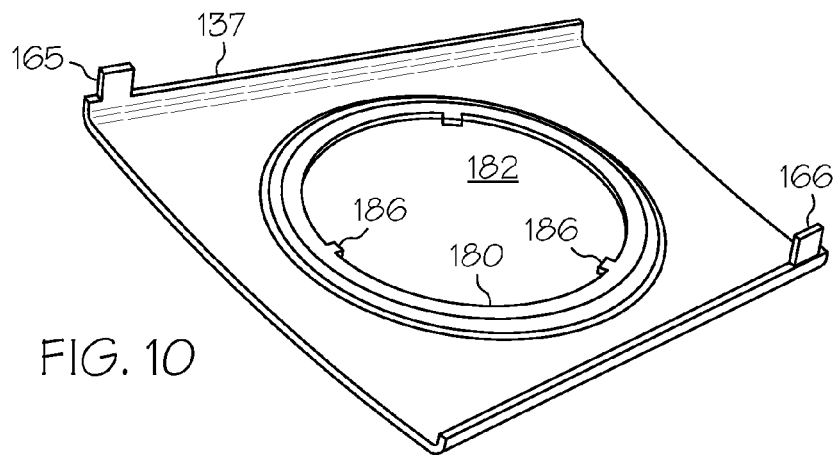

FIGS. 9 and 10 are isometric views of upstream and downstream sides of a heat-shield segment 137 having a thermal barrier coating 156 (e.g. a ceramic; more particularly, 7-8% yttria stabilized zirconia) deposited thereon. The heat-shield segments are also provided with attachment elements for securing the heat-shield to dome assembly 126; e.g., projections 166 that pass through openings 168 (e.g. slots) in dome assembly 126 shown in FIG. 11. Projections 166 also serve as a redundant and independent mechanism for securing the heat shield. In addition, the openings through heat-shield 137 are provided with inwardly directed projections 186 which align and are received within swirler slots 161 (FIG. 5) to prevent rotation thereof.

Figure 12:
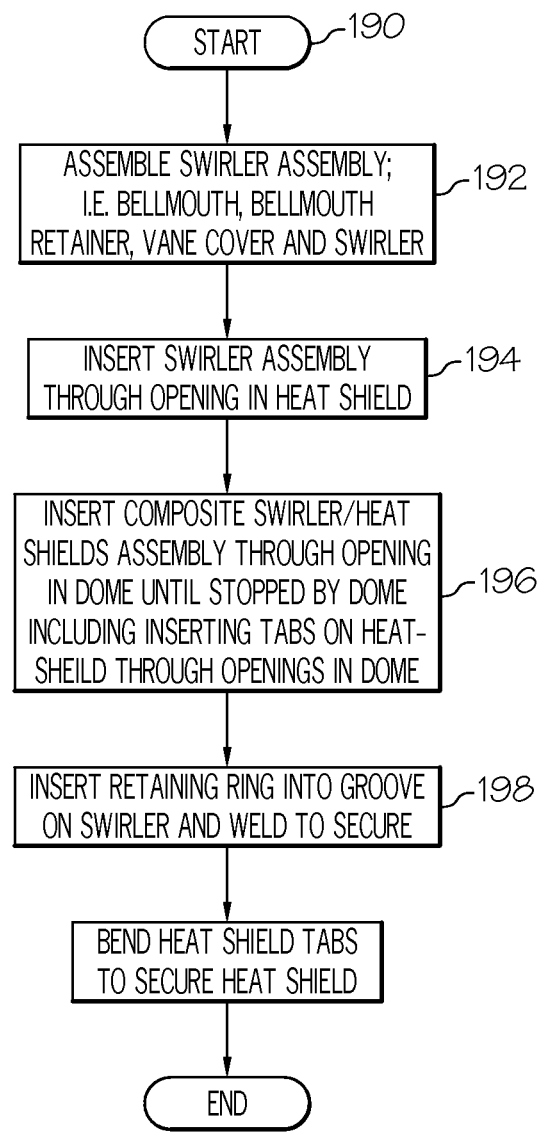
FIG. 12 is a flow chart describing the process for assembling the combustor dome and heat shield assembly in accordance with an embodiment.

FIG. 12 is a flow chart describing the process 190 for assembling the combustor dome and heat-shield assembly in accordance with an embodiment. In STEP 192, the swirler 134 assembly comprised of the bellmouth 132, the bellmouth retainer 138, the vane cover 139, and the swirler is assembled. Next, the swirler is inserted through the opening 182 in the heat-shield 137 from the downstream side to the upstream side (STEP 194). In STEP 196, the composite swirler/heat-shield assembly is inserted through the opening 176 in the dome until stopped by the dome. In STEP 198, the split retaining ring 136 is positioned in groove 144 and the halves welded together to secure the assembly. Finally, tabs 166 on heat-shield 137 that were passed through slots in dome assembly 126 are bent to secure heat-shield 137.

Thus, there has been provided a simplified retaining means for use in conjunction with a combustor dome assembly that employs fewer components resulting in a lighter, less expensive combustor dome assembly.

What is claimed is:

1. A combustor dome and heat-shield assembly comprising:
   a heat-shield having a first opening therethrough and having a first plurality of securing projections;
   a swirler extending through the first opening and capturing the heat-shield, the swirler comprising a first peripheral axial slot;
   a combustor dome having a second opening therethrough and having an upstream surface and a downstream surface, wherein the combustor dome comprises a second plurality of slots, each of the plurality of slots for receiving one of the first plurality of securing projections, the swirler extending through the second opening from the downstream surface to the upstream surface to capture the heat-shield on the downstream surface;
   wherein the second opening comprises a first inwardly extending projection that engages the first peripheral slot to prevent rotation of the swirler; and
   a retaining clip, distinct from the heat shield and the combustor dome, that engages the swirler to secure the swirler and the heat-shield on the combustor dome.

2. The assembly according to claim 1 wherein the heat-shield is a stamped heat-shield.

3. The assembly according to claim 2 further comprising a thermal barrier coating on the downstream surface of the stamped heat-shield.

4. The assembly according to claim 3 wherein the heat-shield is stamped from a high-temperature nickel alloy.

5. The assembly according to claim 3 wherein the thermal barrier coating is a ceramic.

6. The assembly according to claim 1 wherein the retaining clip is a split ring.

7. The assembly according the claim 1 wherein the swirler comprises an annular slot and an annular abutment downstream of the annular slot for capturing the retaining clip in the slot to secure the combustor dome and the heat-shield between the retaining clip and the annular abutment.

8. The assembly according to claim 7 further comprising:
a mouth portion configured to receive fuel therein; and
a radial flange coupled to the swirler downstream of the mouth portion.

9. The assembly according the claim 8 further comprising a vane cover having a radial section coupled to an upstream portion of the swirler and an outboard axial section that extends upstream.

10. The assembly according to claim 9 further comprising a radially extending bellmouth retainer having an end coupled to the radial section of the vane cover forming a slot with the radial section of the vane cover to slidably retain the bellmouth flange therebetween.

11. The assembly according to claim 10 wherein the vane cover is attached to the swirler by brazing.

12. The assembly according to claim 11 wherein the vane cover is coupled to the bellmouth retainer by welding.

13. A method for securing a heat-shield to a downstream surface of a combustor dome in a combustor dome assembly, comprising:
providing a swirler having an annular upstream groove and a downstream annular abutment;
capturing the heat-shield having a first annular opening therethrough by passing the swirler through the first annular opening such that the downstream edge of the first annular opening is captured by an upstream surface of the abutment;
passing the swirler through a second annular opening in the combustor dome of the combustor dome assembly to capture the heat-shield against the downstream surface of the combustor dome; and
securing the swirler with a retaining clip, distinct from the heat shield, that engages the annular upstream groove to secure the heat-shield against the downstream surface of the combustor dome.

14. A method according to claim 13 further comprising stamping the heat-shield.

15. A method according to claim 13 further comprising providing projections in the combustor dome and slots in the swirler, each of the projections receiving one of the slots therethrough to prevent the swirler from rotating.

16. A combustor dome and heat-shield assembly comprising:
a heat-shield having a first opening therethrough and having a first plurality of securing projections;
a swirler extending through the first opening and capturing the heat-shield; a combustor dome having a second opening therethrough and having an upstream surface and a downstream surface, the swirler extending through the second opening from the downstream surface to the upstream surface to capture the heat-shield on the downstream surface, the second opening comprising a second plurality of slots, each of the plurality of slots for receiving one of the first plurality of securing projections; and
a retaining clip, distinct from the heat shield and combustor dome, that engages the swirler to secure the swirler and the heat-shield on the combustor dome, wherein the swirler comprises a first peripheral axial slot and wherein the second opening comprises a first inwardly extending projection that engages the first peripheral slot to prevent rotation of the swirler, and wherein the swirler comprises an annular slot and an annular abutment downstream of the annular slot for capturing the retaining clip in the slot to secure the combustor dome and the heat-shield between the retainer clip and the annular abutment.

* * * * *